US008698790B2

(12) United States Patent
Lee

(10) Patent No.: US 8,698,790 B2
(45) Date of Patent: Apr. 15, 2014

(54) POWER DRIVER, DRIVING METHOD OF THE SAME, AND ORGANIC LIGHT EMITTING DISPLAY DEVICE INCLUDING POWER DRIVER

(75) Inventor: Wook Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 523 days.

(21) Appl. No.: 12/844,128

(22) Filed: Jul. 27, 2010

(65) Prior Publication Data

US 2011/0175880 A1 Jul. 21, 2011

(30) Foreign Application Priority Data

Jan. 21, 2010 (KR) ........................ 10-2010-0005743

(51) Int. Cl.
*G06F 3/038* (2013.01)
*G09G 5/00* (2006.01)

(52) U.S. Cl.
USPC .............................. 345/211; 345/76; 320/112

(58) Field of Classification Search
USPC .................................... 345/76, 211; 320/112
See application file for complete search history.

(56) References Cited

U.S. PATENT DOCUMENTS 7,786,696 B2 * 8/2010 Kim et al. ..................... 320/112
2003/0053321 A1 * 3/2003 Ishiyama ........................ 363/59
2006/0220991 A1 * 10/2006 Lee et al. ........................ 345/52
2006/0262579 A1 * 11/2006 Chou .............................. 363/63
2006/0267410 A1 * 11/2006 Kanouda et al. ................ 307/66
2009/0174366 A1 * 7/2009 Ahmad et al. ................ 320/114
2009/0218937 A1 9/2009 Lee
2009/0219275 A1 * 9/2009 Jeon .............................. 345/212
2009/0261888 A1 10/2009 Clewett et al.
2012/0206431 A1 * 8/2012 Matsuo ......................... 345/211

FOREIGN PATENT DOCUMENTS

KR 10-0648671 11/2006
KR 10-0893473 4/2009
KR 10-2009-0110793 10/2009
WO WO 2005/098806 10/2005

OTHER PUBLICATIONS

English-language abstract of Korean Publication No. 10-2005-0112861.
KIPO Office Action dated Jun. 9, 2011 for Korean priority Patent application 10-2010-0005743, 5 pages.

* cited by examiner

*Primary Examiner* — Kwang-Su Yang
(74) *Attorney, Agent, or Firm* — Christie, Parker & Hale, LLP

(57) ABSTRACT

A power driver for applying a voltage necessary for driving a gate driver for a display panel includes a first booster, a voltage selector, and a second booster. The first booster receives a voltage from a battery and generates a first voltage. The voltage selector selects one of the first voltage and a second voltage generated outside the power driver and applied to the display panel. The second booster receives an output of the voltage selector and generates a voltage necessary for the driving of the gate driver.

31 Claims, 3 Drawing Sheets

POWER DRIVER, DRIVING METHOD OF THE SAME, AND ORGANIC LIGHT EMITTING DISPLAY DEVICE INCLUDING POWER DRIVER

CROSS-REFERENCE TO RELATED APPLICATION

This application claims the benefit of Korean Patent Application No. 10-2010-0005743, filed Jan. 21, 2010 in the Korean Intellectual Property Office, the disclosure of which is incorporated herein by reference.

BACKGROUND

1. Field

Aspects of the present invention relate to a power driver, a method of driving the power driver, and an organic light emitting display (OLED) device including the power driver.

2. Description of the Related Art

Various levels of voltages are required to drive flat panel display devices. For example, a portable device including an Active Matrix Organic Light Emitting Display (AMOLED) device requires a first power voltage ELVDD and a second power voltage ELVSS as voltages necessary for driving of pixel circuits provided on a display panel. Also, the portable device requires a first driving voltage VGH and a second driving voltage VGL for switching of transistors included in respective pixel circuits.

The first power voltage ELVDD and the second power voltage ELVSS are generated by a power IC provided separately from the AMOLED device and are applied to the display panel. The first driving voltage VGH and the second driving voltage VGL are generated in a power driver for driving a Low Temperature Polysilicon (LTPS) gate driver provided in the display panel. In this case, the power driver receives voltages from a battery used in a portable device such as a mobile phone, and then converts the received voltages into necessary voltages. (i.e., the first driving voltage VGH and the second driving voltage VGL).

SUMMARY

Aspects of the present invention provide a power driver that may stably provide voltages necessary for driving of a gate driver regardless of a voltage of a battery, a method of driving the power driver, and an organic light emitting display (OLED) device including the power driver.

According to an aspect of the present invention, there is provided a power driver for applying a voltage necessary for driving a gate driver for a display panel, the power driver including: a first booster receiving a voltage from a battery and generating a first voltage; a voltage selector for selecting one of the first voltage and a second voltage generated to the outside and applied to the display panel; and a second booster receiving an output of the voltage selector and generating a voltage necessary for the driving of the gate driver.

According to an aspect of the present invention, the voltage selector may select the first voltage at an initial stage of an operation of the display panel, and may select the second voltage after the second voltage is stabilized.

According to an aspect of the invention, a time when the second voltage is selected may be a predetermined time.

According to an aspect of the invention, the power driver may further include a waveform detector for detecting a waveform of the second voltage.

According to an aspect of the present invention, the time when the second voltage is selected is determined according to a detection result of the waveform detector.

According to an aspect of the invention, the voltage selector may include: a first switching device connected between the first booster and the second booster; a second switching device connected between a line for supplying the second voltage and the second booster; and a switching controller for controlling a switching operation of the first switching device and the second switching device.

According to an aspect of the invention, when the operation of the display panel is finished, the voltage selector may change the voltage selection from the second voltage to the first voltage.

According to an aspect of the invention, while the voltage selector is selecting the second voltage, the first booster may be turned off.

According to another aspect of the present invention, there is provided a method of driving a power driver that applies a voltage necessary for driving of a gate driver for a display panel, the method including: generating receiving a voltage from a battery and generating a first voltage in a booster; receiving a second voltage generated at the outside and applied to the display panel; selecting one of the first voltage and the second voltage; and generating a voltage necessary for the driving of the gate driver using the selected voltage.

According to an aspect of the invention, the selecting of one of the first voltage and the second voltage may include selecting the first voltage at an initial stage of an operation of the display panel and selecting the second voltage after the second voltage is stabilized.

According to an aspect of the invention, the time when the second voltage is selected may be a predetermined time.

According to an aspect of the invention, the time when the second voltage is selected may be determined according to a detection result of a waveform of the second voltage.

According to an aspect of the invention, the method may further include changing the voltage selection from the second voltage to the first voltage when the operation of the display panel is finished.

According to an aspect of the invention, the method may further include turning off the booster while the second voltage is being selected.

According to still another aspect of the present invention, there is provided an organic light emitting display device including: a display panel including a plurality of pixel circuits; a gate driver for driving the display panel; a first power driver for supplying a voltage necessary for the gate driver; a battery for supplying a voltage to the first power driver; and a second power driver for supplying a power voltage to the display panel, wherein the first power driver generates a voltage necessary for the gate driver using one of the voltage from the battery and a voltage from the second power driver.

According to an aspect of the invention, the first power driver may include: a first booster receiving a voltage from the battery and generating a first voltage; a voltage selector for selecting one of the first voltage and the power voltage; and a second booster receiving an output from the voltage selector and generating a voltage necessary for driving of the gate driver.

According to an aspect of the invention, the voltage selector may select the first voltage at an initial stage of an operation of the display panel, and may select the power voltage after the power voltage is stabilized.

According to an aspect of the invention, a time when the power voltage is selected may be a predetermined time.

According to an aspect of the invention, the organic light emitting display may further include a waveform detector for detecting a waveform of the power voltage.

According to an aspect of the invention, the time when the power voltage is selected may be determined according to a detection result of the waveform detector.

According to an aspect of the invention, when the operation of the display panel is finished, the voltage selector may change the voltage selection from the second voltage to the first voltage.

According to an aspect of the invention, while the voltage selector is selecting the power voltage, the first booster may be turned off.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
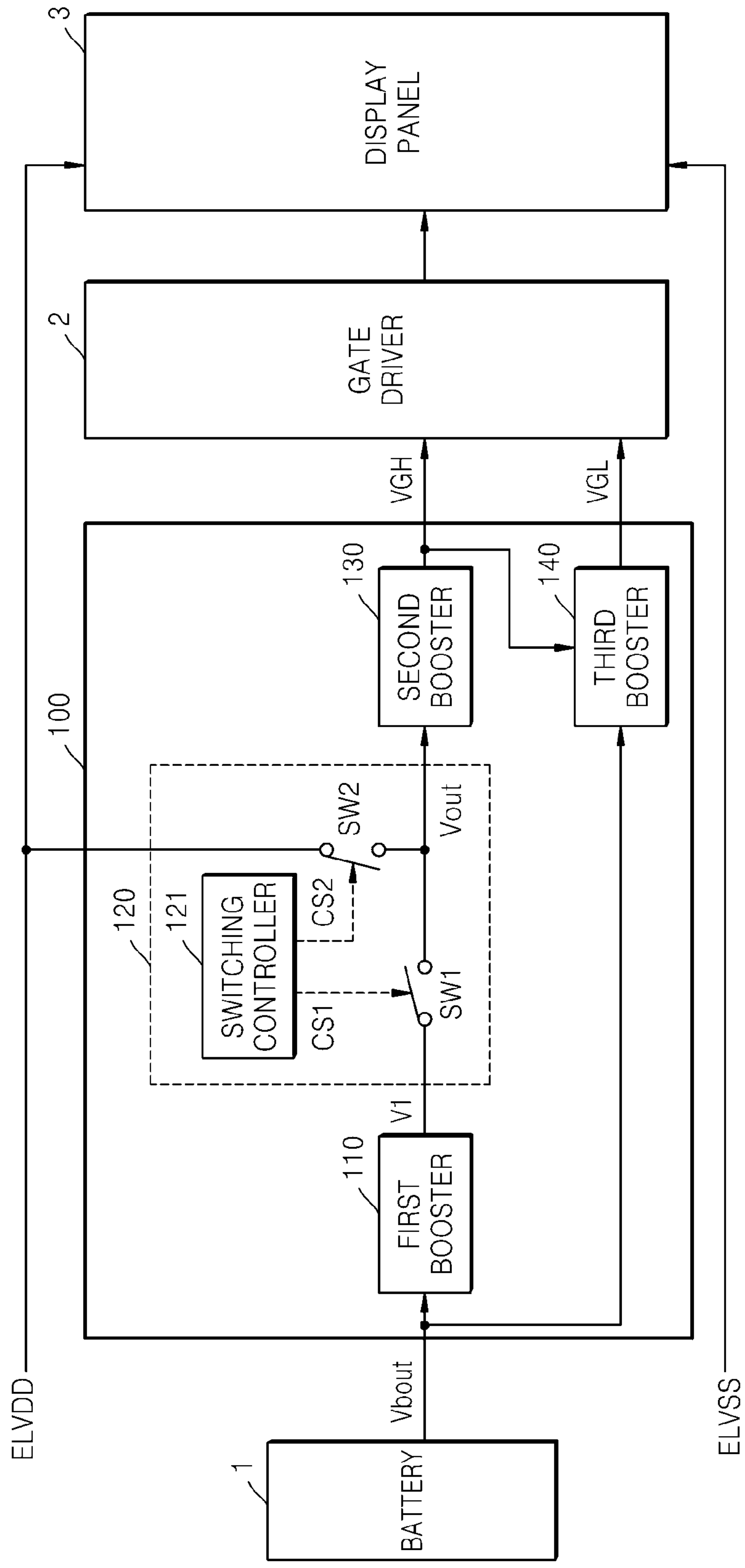
FIG. 1 is a diagram illustrating a power driver and a peripheral configuration thereof, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a power driver 100 and a peripheral configuration thereof, according to an embodiment of the present invention. Referring to FIG. 1, the power driver 100 includes a first booster 110, a voltage selector 120, a second booster 130, and a third booster 140. Also, a battery 1, a gate driver 2, and a display panel 3 may be provided at the outside of the power driver 100, but the invention is not limited thereto.

The battery 1 provides power to the power driver 100. The battery 1 may be a rechargeable secondary cell such as a lead storage battery, nickel cadmium battery, lithium-ion battery, nickel hydrogen storage battery, and a lithium-ion polymer battery, but is not limited thereto. For example, a primary cell such as a dry cell may be used, as can a fuel cell.

The gate driver 2 receives power from the power driver 100 to generate scan signals sequentially, and supplies the sequentially generated scan signals to a plurality of scan lines connected to the gate driver 2. The gate driver 2 may include a shift register to sequentially supply the scan signals to the scan lines.

The display panel 3 receives the scan signals from the gate driver 2. A first power voltage ELVDD and a second power voltage ELVSS are supplied from a separate power IC (not shown) are applied to pixel circuits provided in the display panel 3.

The power driver 100 generates a voltage necessary for driving of the gate driver 2 for driving the display panel 3.

The battery 1 supplies a battery output voltage Vbout. The battery output voltage Vbout is applied to the first booster 110. The first booster 110 generates a first voltage V1 using the battery output voltage Vbout. The first voltage V1 may be greater than the battery output voltage Vbout. Accordingly, the first booster 110 may be a boost converter in which an output voltage is greater than an input voltage. The type of the battery 1 may differ, and the size of the battery output voltage Vbout may vary with the type of the battery 1. Accordingly, the first booster 110 may be configured to generate the first voltage V1 from various voltage ranges, but the invention is not limited thereto.

The shown voltage selector 120 is provided between the first booster 110 and the second booster 130. The first voltage V1 outputted from the first booster 110 and the first power voltage ELVDD generated in the external power IC is applied to the voltage selector 120. The voltage selector 120 selects one of the first voltage V1 and the first power voltage ELVDD to output to the second booster 130. That is, the output voltage Vout of the voltage selector 120 may be one of the first voltage V1 and the first power voltage ELVDD.

The voltage selector 120 includes a first switching device SW1, a second switching device SW2, and a switching controller 121 to select one of the above two voltages V1, ELVAD.

The first switching device SW1 is connected between the output terminal of the first booster 110 and the input terminal of the second booster 130. The second switching device SW2 connected between a line for supplying the first power voltage ELVDD or the output terminal of the external power IC outputting the first power voltage ELVDD and the input terminal of the second booster 130.

While not required in all aspects, the shown switching controller 121 generates a first control signal CS1 controlling a switching operation of the first switching device SW1 and a second control signal CS2 controlling a switching operation of the second switching device SW2. Since one of the first voltage V1 or the first power voltage ELVDD is applied to the second booster 130, the switching controller 121 may allow the first switching device SW1 and the second switching device SW2 to be alternately turned on. While not required in all aspects, the switching controller 121 can be implemented using at least one general and/or special purpose processor implementing instructions encoded in a computer readable medium as software and/or firmware.

The switching controller 121 controls the switching operations of the first switching device SW1 and the second switching device SW2 according to a predetermined time or a stabilized degree of a waveform of the first power voltage ELVDD.

The second booster 130 receives the output voltage Vout of the voltage selector 120 to generate a first driving voltage VGH necessary for driving of the gate driver 2. The first driving voltage VGH, the output voltage of the second booster 130, may be greater than the output voltage Vout of the voltage selector 120, the input voltage of the second booster 130. Accordingly, the second booster 130 may be a booster converter.

The third booster 140 receives the output voltage Vbout of the battery 1 and the first driving voltage VGH that is the output voltage of the second booster 130, to generate a second driving voltage VGL necessary for driving of the gate driver 2. The second driving voltage VGL that is the output voltage of the third booster 140 may have a value of different polarity from that of the first driving voltage VGH that is the output voltage of the third booster 140. Accordingly, the third booster 140 may be a buck converter.

Figure 2:
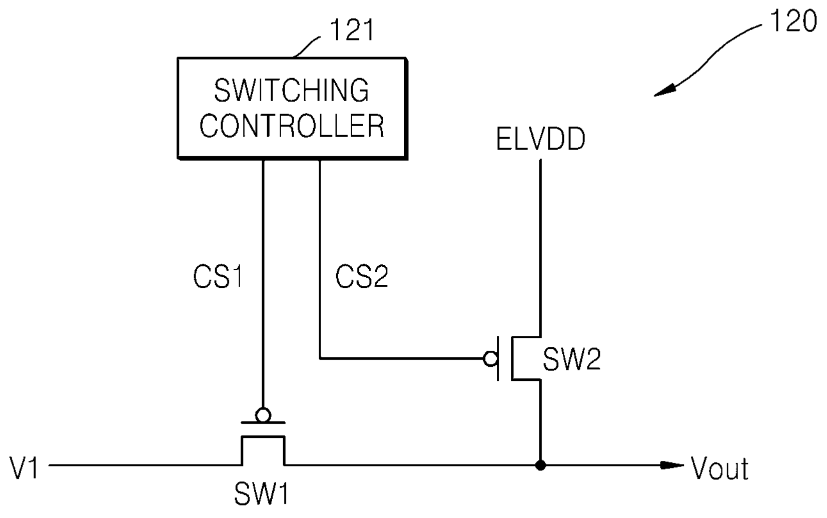
FIG. 2 is a diagram illustrating a voltage selector according to an embodiment of the present invention.

FIG. 2 is a diagram illustrating a voltage selector 120 according to an embodiment of the present invention. The voltage selector 120 may use a transistor as a switching device as shown, but the invention is not limited thereto. Referring to FIG. 2, the first switching device SW1 and the switching device SW2 may include a PMOS transistor, respectively.

The first switching device SW1 is connected between the output terminal of the first booster 110 and the output terminal of the voltage selector 120. A first control signal CS1 is applied to the gate electrode of the first switching device SW1. When the first control signal CS1 is at a low level, the first voltage V1 is applied to the second booster 130. When the first control signal CS1 is at a high level, the first voltage V1 is not applied to the second booster 130.

The second switching device SW2 is connected between the line for supplying the first power voltage ELVDD and the output terminal of the voltage selector 120. A second control signal CS2 is applied to the gate electrode of the second switching device SW2. When the second control signal CS2 is at a low level, the first power voltage ELVDD is applied to the second booster 130. When the second control signal CS2 is at a high level, the first power voltage ELVDD is applied to the second booster 130.

In this embodiment, PMOS transistors may be used as the first and second switching devices SW1 and SW2, but the types of transistors are not limited thereto. For example, NMOS transistors may be used as the first and second switching devices SW1 and SW2. In addition, various switching devices capable of performing a switching operation may be used. Lastly, it is understood that the switch SW1 could apply the first voltage V1 when the control signal CS1 is at the high level, and/or the switch SW2 could apply the first power voltage ELVDD when the control signal CS2 is at the high level.

Figure 3:
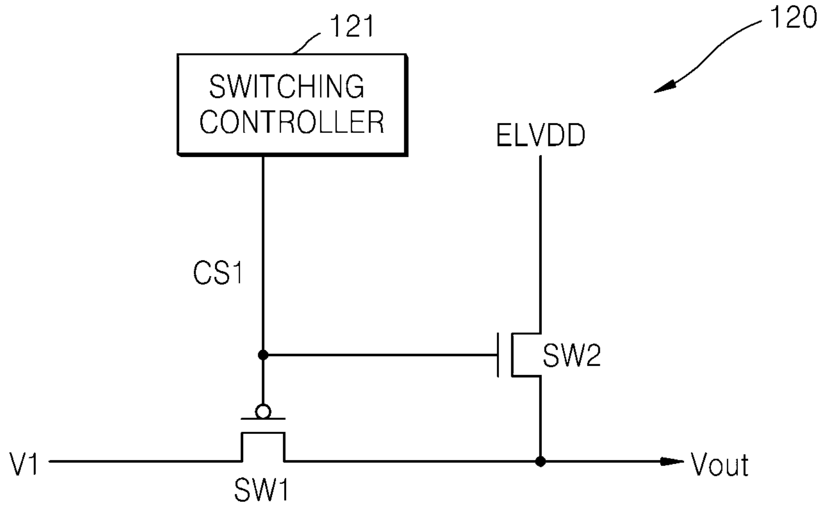
FIG. 3 is a diagram illustrating a voltage selector according to another embodiment of the present invention.

FIG. 3 is a diagram illustrating a voltage selector 120 according to another embodiment. The voltage selector 120 may use a transistor as a switching device. Referring to FIG. 3, a first switching device SW1 may include a PMOS transistor, and a second switching device SW2 may include an NMOS transistor.

Since a connection relation between the first switching device SW1 and the second switching device SW2 may be similar to that of the embodiment of FIG. 2, detailed description thereof will be omitted here.

The logic levels of control signals for the on-state of the first and second switching devices SW1 and SW2 may be different from each other. That is, the first switching device SW1 may become the on-state when a low level signal is applied to the gate electrode. The second switching device SW2 may become the off-state when a high level signal is applied to the gate electrode. Accordingly, the first and second switching devices SW1 and SW2 may be alternately switched to the on-state by applying the first control signal CS1 that is the same control signal. In this embodiment, PMOS transistors may be used as the first and second switching devices SW1 and SW2, but are not limited thereto. For example, an NMOS transistor may be used as the first switching device SW1. A PMOS transistor may be used as the second may be used as the second switching device SW2. In addition, switching devices having opposite on/off states with respect to the same control signal, respectively, may be used.

Hereinafter, a method of driving the power driver 100 of the above embodiment will be described. When a display panel 3 is operated by a user, for example, when a user clicks a button of a mobile phone to display an image on its display screen, the power driver 100 generates voltages necessary for operation of the display panel 3.

In a power IC (not shown) which is separate from the power driver 100, a first power voltage ELVDD and a second power voltage ELVSS are generated to drive a pixel circuit provided in the display panel 3. The generated first and second power voltages ELVDD and ELVSS are applied to the display panel 3. At the same time, the power driver 100 receives a battery output voltage Vbout from the battery 1, and generates a first voltage V1 using a first booster 110. At the initial stage of operation, the voltage selector 120 applies the first control signal CS1 to the first switching device SW1 to turn on the first switching device SW1 and allow the first voltage V1 to be applied to the second booster 130.

The second booster 130 generates a first driving voltage VGH using the first voltage V1, and applies the first driving voltage VGH to a gate driver 2. A third booster 140 generates a second driving voltage VGL using the battery output voltage Vbout and the first driving voltage VGH, and applies the second driving voltage VGL to the gate driver 2.

At the initial stage of operation of the display panel 3, the first power voltage ELVDD and the second power voltage ELVSS generated in the external power IC (not shown) may be simultaneously applied to the respective pixel circuits of the display panel 3, thereby generating an inrush current of a considerable size. Due to the characteristics of the power IC generating the first power voltage ELVDD, a considerable ripple may occur in the first power voltage ELVDD at the initial stage of the display panel 3, and it may take the first power voltage ELVDD considerable time to be stabilized. However, after the lapse of a certain time, the inrush current may be removed, and the first power voltage ELVDD may also be stabilized. Accordingly, after the lapse of a certain time, the switching controller 121 may apply the first power voltage ELVDD instead of the first voltage V1 to the second booster 130 at a time when the first power voltage ELVDD is stabilized.

In order to apply the first power voltage ELVDD instead of the first voltage V1, the switching controller 121 applies the first control signal CS1 to the first switching device SW1 such that the first switching device SW1 is turned off, and applies the second control signal CS2 to the second switching device SW2 such that the second switching device SW2 is turned on. In this case, a time or a timing at which the switching controller 121 changes the voltage applied to the second booster 130 may be determined by a predetermined time. For example, a timing at which the first power voltage ELVDD is stabilized may be calculated and preset by repeated experiments, and the switching controller 121 may change the voltage applied to the second booster 130 according to the preset timing. Such timing information can be stored on a computer readable medium for use by the switching controller 121, but the invention is not limited thereto.

The time or timing at which the switching controller 121 changes the voltage applied to the second booster 130 may be variable. According, a separate device may be provided to detect the waveform of the first power voltage ELVDD according to an aspect of the invention. When detecting a waveform of the first power voltage ELVDD and determining that the waveform of the first power voltage ELVDD has been stabilized, the switching controller 121 may change a voltage selection from the first voltage V1 to the first power voltage ELVDD according to the waveform detected by the separate device.

While the switching controller 121 is applying the first power voltage ELVDD to the second booster 130, there is no need to generate the first voltage V1. Accordingly, while the switching controller 121 is selecting the first power voltage ELVDD, the first booster 110 may be turned off to stop a boosting operation of the voltage Vbout.

At the final stage of the operation of the display panel 3, an opposite sequence to the initial stage of the operation of the display panel 3 may be conducted. That is, if the operation of the display panel 3 is finished, the first and second power voltages ELVDD and ELVSS applied from the external power IC to the display panel 3 may be cut off. The sudden cutting-off of the voltage may cause generation of an inrush current.

Accordingly, at the final stage of the operation of the display panel 3, the voltage selector 120 may change the selection voltage (i.e., the voltage applied to the second booster 130 from the first voltage ELVDD to the first voltage V1). In this case, while the first power voltage ELVDD is being applied to the second booster 130, the first booster 110 may be maintained in the off-state. However, at the final stage of the operation of the display panel 3, the first booster 110 may need to be returned to the on-state.

In a conventional power driver, a voltage necessary for driving of the gate driver 2 has been generated using only a voltage of the battery 1. In this case, as the voltage range of the battery 1 becomes greater, the efficiency of generating the first and second driving voltages VGH and VGL in a driver IC embedded in a power driver may be lowered. Also, when the display panel 3 has a high resolution of, for example, VGA grade or more, an internal dynamic current may be too great to embed the power driver into the driver IC.

As described above, however, the power driver 100 according to this embodiment may generate a voltage necessary for driving of the gate driver 2 using the first voltage V1 generated by the output voltage Vbout of the battery 1 at the initial stage of the operation of the display panel 3, and may generate a voltage necessary of driving of the gate driver 2 using a voltage applied to the display panel 3 after the lapse of a certain time.

While not limited thereto, the power driver according to this embodiment has the advantages described below. The power driver 100 may stably and efficiently supply the first driving voltage VGH to the gate driver 2 regardless of the extension of the voltage range of the battery 1. The power driver 100 may also be embedded into the driver IC even in a high-quality display panel 3. Since all voltages necessary for pixel circuits may be generated from the same power source, the reduction of display quality by ripple noises may be inhibited. Since the operation of the first booster 110 can be stopped during the operation of the display panel 3, power consumption may be reduced, and an EMI improvement effect may occur.

At the initial or final stage of the operation of the display panel 3, black data has to be displayed to prevent an abnormal image from being displayed. In this case, the output voltage Vbout of the battery 1 capable of supplying a stable voltage in a short time may be used to maintain the black data.

Figure 4:
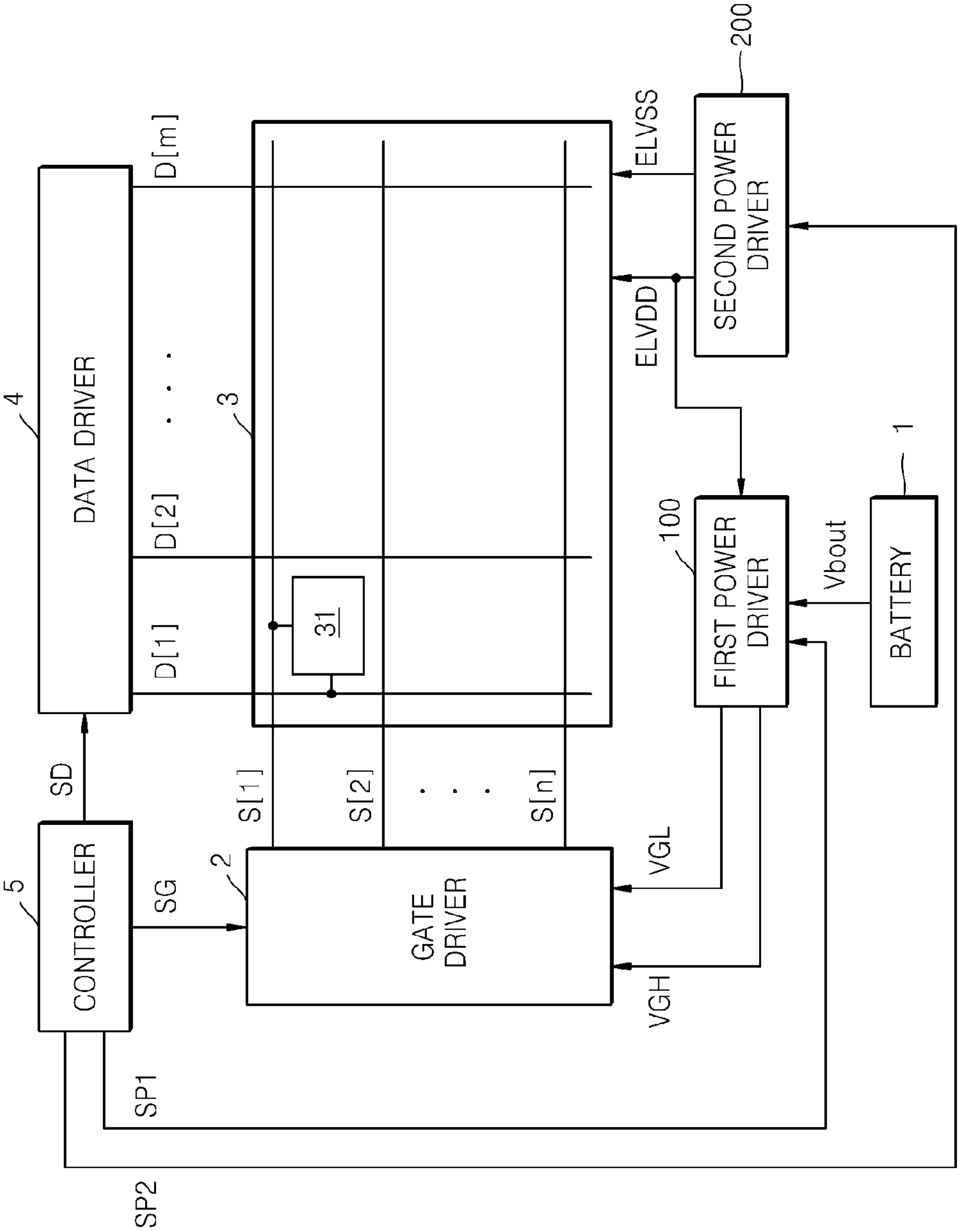
FIG. 4 is a diagram illustrating an organic light emitting display (OLED) device according to an embodiment of the present invention.

FIG. 4 is a diagram illustrating an organic light emitting display (OLED) device according to an embodiment of the present invention. Referring to FIG. 4, the OLED device includes the first power driver 100, a second power driver 200, the battery 1, the gate driver 2, the display panel 3, a data driver 4, and a controller 5.

The first and second drivers 100 and 200 receive control signals SP1 and SP2 from the controller 5, and generate a voltage necessary for driving of the gate driver 2 or driving of a pixel circuit 31. The first power driver 100 may be similar to the power driver 100 of FIG. 1, and may supply a voltage necessary for driving of the gate driver 2 to the gate driver 2. Specifically, the first power driver 100 applies a first driving voltage VGH and a second driving voltage VGL to the gate driver 2. Also, although not shown, the first power driver 100 may supply a gamma voltage to the data driver 4. The first power driver 100 may be embedded into a driver IC.

The second power driver 200 may be a power IC and is provided separately from the first power driver 100. The second driver 200 may be separately provided to the outside of the driver IC, and applies first power voltage ELVDD and a second power voltage ELVSS to the display panel 3. The second power driver 200 applies the first power voltage ELVDD to the first power driver 100.

The battery 1 supplies a voltage Vbout such that the first power driver 100 generates the voltages VGH, VGL necessary for driving of the gate driver 2. The gate driver 2 supplies scan signals to a plurality of scan lines S[1] . . . S[n] according to control signals SG from the controller 5. The scan signals may be sequentially applied to the scan lines S[1] . . . S[n], and data signals are applied to the pixel circuit 31 in accordance with the scan signals.

The data driver 4 applies data signals to a plurality of data lines D[1] . . . D[m] according to control signals SD from the controller 5. The data lines D[1] . . . D[m] are connected to the output terminal of the data driver 4.

The display panel 3 includes n×m pixel circuits 31. N scan lines S[1] . . . S[n] are disposed in a row direction. M data lines D[1] . . . D[m] disposed in a column direction. The scan lines S[1] . . . S[n] deliver the scan signals to the pixel circuits 31. The data lines D[1] . . . D[m] deliver the data signals to the pixel circuits 31. The display panel 3 may be an OLED, but the invention is not limited thereto.

The controller 5 controls operations of the respective components of the OLED device. For this, the controller 5 applies the control signal SG for the gate driver 2, the control signal SD for the data driver 4, and the control signals SP1 and SP2 for the first and second power drivers 100 and 200 to the respective components. The controller 5 further includes a waveform detector which detects a waveform of the first power voltage ELVDD, and may control the first power driver 100 to select one of the first voltage V1 and the first power voltage ELVDD according to the detected waveform. Alternately, the controller 5 may cause the first power driver 100 to select one of the first voltage V1 and the first power voltage ELVDD after a predetermined time The first power driver 100 and the peripheral configuration thereof have been described with reference to FIG. 1. Accordingly, a detailed description thereof will be omitted herein.

The OLED including the first power driver 100 according to this embodiment may stably and efficiently supply the first driving voltage VGH to the gate driver 2 regardless of the extension of the voltage range of the battery 1. The first power driver 100 may also be embedded into the driver IC even in a high-quality display panel 3.

Since all voltages necessary for pixel circuits 31 may be generated from the same power source, the reduction of display quality by ripple noises may be prevented.

Since the operation of the first booster 110 can be stopped during the operation of the display panel 3, power consumption may be reduced, and an EMI improvement effect may occur.

At the initial or final stage of the operation of the display panel 3, black data has to be displayed to prevent an abnormal image from being displayed. In this case, the output voltage Vbout of the battery 1 capable of supplying a stable voltage in a short time may be used to maintain the black data.

According to the above embodiments, voltages necessary for driving of a gate driver can be stably provided regardless of a voltage of a battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power driver for applying a voltage necessary for driving a gate driver for a display panel, the power driver comprising:

a first booster which receives a battery voltage from a battery and generates a first voltage from the received battery voltage;

a voltage selector which selects between the generated first voltage and a second voltage generated outside of the power driver and applied to the display panel, and outputs the selected voltage; and a second booster which receives the selected voltage output from the voltage selector and converts the selected voltage to generate a different voltage which is a voltage necessary for driving the gate driver.

2. The power driver of claim 1, wherein the voltage selector selects the generated first voltage at an initial stage of an operation of the display panel, and selects the second voltage after the second voltage is stabilized.

3. The power driver of claim 2, wherein the voltage selector selects the second voltage at a predetermined time after a beginning of the initial stage.

4. The power driver of claim 2, further comprising a waveform detector which detects a waveform of the second voltage, wherein the voltage selector selects the second voltage according to a detection result of the waveform detector.

5. The power driver of claim 2, wherein the voltage selector comprises:

a first switching device connected between the first booster and the second booster;

a second switching device connected between a line which supplies the second voltage to the display panel and the second booster; and a switching controller which controls a switching operation of the first switching device and the second switching device to select between the generated first voltage and the second voltage.

6. The power driver of claim 2, wherein, when the operation of the display panel is finished, the voltage selector changes the selected voltage from the second voltage to the generated first voltage.

7. The power driver of claim 1, wherein, while the voltage selector has selected the second voltage, the first booster is turned off.

8. The power driver of claim 1, further comprising a third booster which receives the battery voltage and the voltage necessary for driving the gate driver, and generates another voltage necessary for driving the gate driver.

9. The power driver of claim 8, wherein the voltage necessary for the driving of the gate driver comprises a first driving voltage, and the another voltage necessary for the driving of the gate driver comprises a second driving voltage.

10. The power driver of claim 1, wherein the first voltage is greater than the received battery voltage.

11. A method of driving a power driver that applies a voltage necessary for driving a gate driver for a display panel, the method comprising:

receiving a battery voltage from a battery and generating a first voltage in a booster from the received battery voltage;

receiving a second voltage generated external to the power driver and which is applied to the display panel;

selecting one of the generated first voltage and the received second voltage; and generating a voltage necessary for driving the gate driver by converting the selected voltage to a different voltage.

12. The method of claim 11, wherein the selecting of one of the generated first voltage and the second voltage comprises selecting the generated first voltage at an initial stage of an operation of the display panel and selecting the second voltage after the second voltage is stabilized.

13. The method of claim 12, wherein the selecting the second voltage comprises selecting the second voltage at a predetermined time after a beginning of the initial stage.

14. The method of claim 12, wherein the selecting the second voltage comprises detecting a waveform of the second voltage and selecting the second voltage according to a detection result of the waveform.

15. The method of claim 12, further comprising changing the selected voltage from the second voltage to the first voltage when the operation of the display panel is finished.

16. The method of claim 11, further comprising turning off the booster when the second voltage is selected.

17. An organic light emitting display device comprising:

a display panel comprising a plurality of pixel circuits;

a gate driver which drives the display panel;

a first power driver which supplies a voltage necessary for the gate driver to drive the display panel;

a battery which supplies a battery voltage to the first power driver; and a second power driver which supplies a power voltage to the display panel, wherein the first power driver generates a voltage necessary for the gate driver by converting the battery voltage from the battery or by converting the power voltage from the second power driver, the voltage necessary for the gate driver being different from the battery voltage and being different from the power voltage from the second power driver.

18. The organic light emitting display device of claim 17, wherein the first power driver comprises:

a first booster which receives the battery voltage from the battery and generates a first voltage;

a voltage selector which selects between the generated first voltage and the power voltage and outputs the selected voltage; and a second booster which receives the selected voltage output from the voltage selector and generates the voltage necessary for driving the gate driver from the selected voltage.

19. The organic light emitting display device of claim 18, wherein the voltage selector selects the generated first voltage at an initial stage of an operation of the display panel, and selects the power voltage after the power voltage is stabilized.

20. The organic light emitting display device of claim 18, wherein the voltage selector selects the power voltage after a beginning of an initial stage of an operation of the display panel.

21. The organic light emitting display device of claim 18, further comprising a waveform detector which detects a waveform of the power voltage, wherein the voltage selector selects the power voltage according to a detection result of the waveform detector.

22. The organic light emitting display device of claim 18, wherein, when an operation of the display panel is finished, the voltage selector changes the selected voltage from the second voltage to the generated first voltage.

23. The organic light emitting display device of claim 18, wherein, while the voltage selector has selected the power voltage, the first booster is turned off.

24. A voltage selector for use in a power driver for applying a voltage necessary for driving a gate driver for a display panel, the voltage selector comprising:

a first switch disposed between a second booster of the power driver and a first booster of the power driver and which receives a first voltage directly from the first booster;

a second switch disposed between the second booster and a line through which a power voltage is applied to the display panel and which receives the power voltage; and a switching controller which selectively activates the first switch to apply the first voltage instead of the power voltage to the second booster to generate the voltage necessary for driving the gate driver, and selectively activates the second switch to apply the power voltage instead of the first voltage to the second booster to generate the voltage necessary for driving the gate driver according to a determined stability of a waveform of the power voltage.

25. The voltage selector of claim 24, wherein the switching controller determines the stability of the waveform according to a time after a beginning of an operation of the display panel, activates the first switch and deactivates the second switch for a predetermined time after the beginning, and activates the second switch and deactivates the first switch after the predetermined time.

26. The voltage selector of claim 24, wherein the switching controller senses the stability of the waveform, activates the first switch and deactivates the second switch while sensing that the waveform is unstable, and activates the second switch and deactivates the first switch while sensing that the waveform is stable.

27. The voltage selector of claim 24, wherein the switching controller issues a single control signal to activate one of the first and second switches and deactivate the other one of the first and second switches.

28. The voltage selector of claim 24, wherein, when the operation of the display panel is completed, the switching controller activates the first switch and deactivates the second switch in order to supply the first voltage to the second booster.

29. The voltage selector of claim 24, wherein the switching controller further controls the first booster to be turned off while the second switch is activated to apply the power voltage to the second booster.

30. The voltage selector of claim 24, wherein the voltage necessary for driving the gate driver that is output from the second booster comprises a first driving voltage.

31. The power driver comprising the first booster, the second booster, and the voltage selector of claim 24.

* * * * *